United States Patent
Vaananen et al.

(10) Patent No.: US 9,727,095 B2
(45) Date of Patent: Aug. 8, 2017

(54) METHOD, DEVICE AND PROGRAM FOR BROWSING INFORMATION ON A DISPLAY

(75) Inventors: Johannes Vaananen, Oulu (FI); Manne Hannula, Kempele (FI)

(73) Assignee: APPLE INC., Cupertino, CA (US)

( * ) Notice: Subject to any disclaimer, the term of this patent is extended or adjusted under 35 U.S.C. 154(b) by 1997 days.

(21) Appl. No.: 12/691,506

(22) Filed: Jan. 21, 2010

(65) Prior Publication Data
US 2010/0125818 A1  May 20, 2010
US 2017/0192729 A9  Jul. 6, 2017

Related U.S. Application Data

(63) Continuation of application No. 12/569,797, filed on Sep. 29, 2009, now abandoned, which is a
(Continued)

(30) Foreign Application Priority Data

May 16, 2001 (FI) ..................................... 20011039

(51) Int. Cl.
G06F 3/048 (2013.01)
G09G 5/00 (2006.01)
G06F 1/16 (2006.01)

(52) U.S. Cl.
CPC .......... G06F 1/1694 (2013.01); G06F 1/1626 (2013.01); G06F 1/1686 (2013.01);
(Continued)

(58) Field of Classification Search
CPC ...... G06F 3/0485; G06F 3/017; G06F 1/1694; G06F 3/0346; G06F 2200/1637; G06F 3/0482; G06F 3/04842
See application file for complete search history.

(56) References Cited

U.S. PATENT DOCUMENTS

| 4,720,703 A | 1/1988 | Schnarel, Jr. et al. |
| 4,786,897 A | 11/1988 | Takanashi et al. |

(Continued)

FOREIGN PATENT DOCUMENTS

| EP | 0429391 A1 | 5/1991 |
| EP | 0 805 389 A2 | 11/1997 |

(Continued)

OTHER PUBLICATIONS

International Search Report mailed on Jun. 5, 2002 for PCT Patent Application No. PCT/FI2002/000095, 3 pages.
(Continued)

Primary Examiner — Tadeese Hailu
(74) Attorney, Agent, or Firm — Morgan, Lewis & Bockius LLP

(57) ABSTRACT

In one embodiment, a method and program for browsing information on a hand-held device having a display is provided. The device includes (1) showing on the display a portion of the page residing around the predefined point and having a shape similar to the shape of the display, (2) generating a mirror line by mirroring the reference line in relation to a line that is perpendicular to the display surface and travels via the reference point in response to tilting of the hand-held device in relation to the spatial initial state, (3) defining a hit point (xn,yn) where the mirror line hits the virtual surface and the page containing information, and (4) showing on the display at least a portion of the page around the hit point, said portion to have a shape similar to the shape of the display, the position of the hit point on the page to correspond to the position of the reference point on the display.

28 Claims, 8 Drawing Sheets

Figure 1:
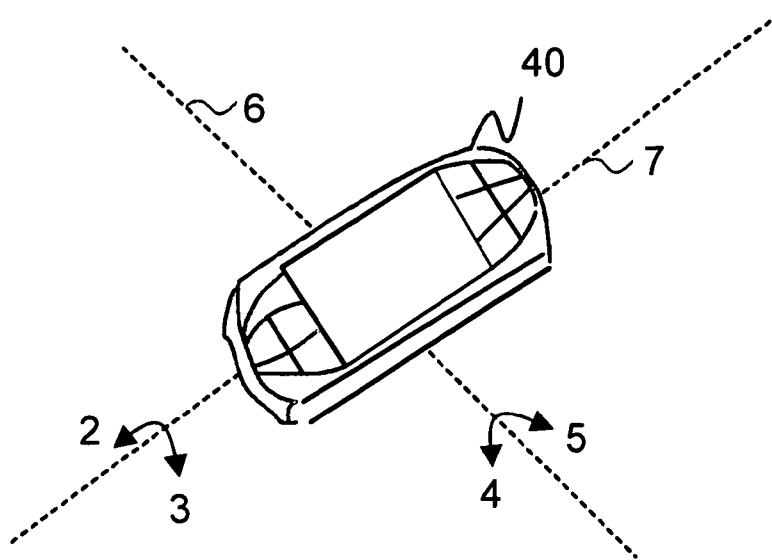

Related U.S. Application Data continuation of application No. 11/159,786, filed on Jun. 23, 2005, now Pat. No. 7,607,111, which is a continuation-in-part of application No. 10/071,172, filed on Feb. 8, 2002, now abandoned.

(52) U.S. Cl.
CPC ............ *G06F 2200/1614* (2013.01); *G06F 2200/1637* (2013.01)

(56) References Cited

U.S. PATENT DOCUMENTS

| | | | |
|---|---|---|---|
| 4,787,051 A | 11/1988 | Olson | |
| 5,367,614 A | 11/1994 | Bisey | |
| 5,463,725 A | 10/1995 | Henckel et al. | |
| 5,526,481 A | 6/1996 | Parks et al. | |
| 5,602,566 A | 2/1997 | Motosyuku et al. | |
| 6,115,025 A * | 9/2000 | Buxton et al. | 345/659 |
| 6,151,208 A | 11/2000 | Bartlett | |
| 6,157,368 A | 12/2000 | Fäger | |
| 6,201,554 B1 * | 3/2001 | Lands | 345/169 |
| 6,288,704 B1 | 9/2001 | Flack et al. | |
| 6,369,794 B1 | 4/2002 | Sakurai et al. | |
| 6,375,572 B1 * | 4/2002 | Masuyama et al. | 463/43 |
| 6,400,376 B1 * | 6/2002 | Singh et al. | 345/685 |
| 6,466,198 B1 * | 10/2002 | Feinstein | 345/158 |
| 6,489,945 B1 | 12/2002 | Gordon | |
| 6,552,713 B1 | 4/2003 | Van Brocklin et al. | |
| 6,567,101 B1 * | 5/2003 | Thomas | 345/649 |
| 6,577,296 B2 | 6/2003 | Flack | |
| 6,603,485 B2 | 8/2003 | Forman | |
| 6,624,824 B1 | 9/2003 | Tognazzini et al. | |
| 6,690,358 B2 * | 2/2004 | Kaplan | 345/158 |
| 6,765,443 B2 * | 7/2004 | Pehike | 330/296 |
| 6,765,553 B1 | 7/2004 | Odamura | |
| 6,797,937 B2 | 9/2004 | Norskog et al. | |
| 6,834,249 B2 | 12/2004 | Orchard | |
| 6,872,931 B2 | 3/2005 | Liess et al. | |
| 6,933,923 B2 * | 8/2005 | Feinstein | 345/158 |
| 6,937,140 B1 | 8/2005 | Outslay et al. | |
| 6,939,231 B2 | 9/2005 | Mäntyjärvi et al. | |
| 6,977,675 B2 | 12/2005 | Kotzin | |
| 6,995,746 B2 | 2/2006 | Aymeric | |
| 7,034,803 B1 | 4/2006 | Reiffel | |
| 7,058,432 B2 | 6/2006 | Nishimoto | |
| 7,100,123 B1 | 8/2006 | Todd et al. | |
| 7,124,374 B1 | 10/2006 | Haken | |
| 7,138,979 B2 | 11/2006 | Robin et al. | |
| 7,159,172 B1 | 1/2007 | Bentley et al. | |
| 7,162,268 B2 | 1/2007 | Koyama | |
| 7,164,411 B2 | 1/2007 | Keranen et al. | |
| 7,184,025 B2 | 2/2007 | Williams et al. | |
| 7,194,702 B1 | 3/2007 | Peasley | |
| 7,194,816 B2 | 3/2007 | Tamura | |
| 7,242,391 B2 | 7/2007 | Lin et al. | |
| 7,271,795 B2 | 9/2007 | Bradski | |
| 7,289,102 B2 | 10/2007 | Hinckley et al. | |
| 7,301,528 B2 | 11/2007 | Marvit et al. | |
| 7,302,280 B2 | 11/2007 | Hinckley et al. | |
| 7,315,751 B2 | 1/2008 | Kurakane | |
| 7,567,818 B2 | 7/2009 | Pylkko | |
| 7,601,066 B1 | 10/2009 | Masuyama et al. | |
| 7,607,111 B2 | 10/2009 | Vaananen et al. | |
| 7,679,604 B2 | 3/2010 | Uhlik et al. | |
| 7,688,306 B2 | 3/2010 | Wehrenberg et al. | |
| 7,721,968 B2 | 5/2010 | Wigdor | |
| 7,827,698 B2 | 11/2010 | Jaiswal | |
| 7,848,542 B2 | 12/2010 | Hildreth | |
| 7,859,553 B2 | 12/2010 | Bae | |
| 8,099,124 B2 | 1/2012 | Tilley | |
| 8,164,640 B2 | 4/2012 | Vartiainen et al. | |
| 8,230,610 B2 | 7/2012 | Jaiswal et al. | |
| 8,355,031 B2 | 1/2013 | Hinterberger et al. | |
| 8,502,775 B2 | 8/2013 | Orchard et al. | |
| 2002/0052209 A1 | 5/2002 | Frohlund | |
| 2002/0126136 A1 | 9/2002 | Lin | |
| 2002/0143489 A1 | 10/2002 | Orchard | |
| 2002/0167699 A1 | 11/2002 | Verplaetse et al. | |
| 2002/0175896 A1 | 11/2002 | Vaananen et al. | |
| 2002/0180733 A1 | 12/2002 | Colmenarez et al. | |
| 2003/0001863 A1 | 1/2003 | Davidson et al. | |
| 2003/0126100 A1 | 7/2003 | Chithambaram | |
| 2003/0234797 A1 | 12/2003 | Williams et al. | |
| 2004/0012566 A1 | 1/2004 | Bradski | |
| 2004/0196259 A1 | 10/2004 | Bradski | |
| 2004/0204067 A1 | 10/2004 | Kurakane | |
| 2005/0208978 A1 | 9/2005 | Pylkko | |
| 2006/0129951 A1 | 6/2006 | Vaananen et al. | |
| 2006/0146009 A1 | 7/2006 | Syrbe et al. | |
| 2006/0152710 A1 | 7/2006 | Braunecker et al. | |
| 2006/0192759 A1 | 8/2006 | Adams et al. | |
| 2007/0205980 A1 | 9/2007 | Dijk | |
| 2008/0030360 A1 | 2/2008 | Griffin | |
| 2009/0016606 A1 | 1/2009 | Meyer et al. | |
| 2009/0297062 A1 | 12/2009 | Molne et al. | |
| 2009/0303204 A1 | 12/2009 | Nasiri et al. | |
| 2009/0305727 A1 | 12/2009 | Pylkko | |
| 2009/0313584 A1 | 12/2009 | Kerr et al. | |
| 2010/0020102 A1 | 1/2010 | Vaananen et al. | |
| 2010/0153891 A1 | 6/2010 | Vaananen et al. | |
| 2010/0171691 A1 | 7/2010 | Cook et al. | |
| 2011/0283223 A1 | 11/2011 | Vaittinen et al. | |
| 2015/0199026 A1 | 7/2015 | Cook et al. | |

FOREIGN PATENT DOCUMENTS

| | | |
|---|---|---|
| EP | 1 063 607 A1 | 12/2000 |
| EP | 1 241 616 A2 | 9/2002 |
| EP | 1 524 588 A1 | 4/2005 |
| GB | 2 387 755 A | 10/2003 |
| GB | 2 358 336 A | 7/2007 |
| JP | 10-11249 A | 1/1998 |
| JP | 2000-259856 A | 9/2000 |
| TW | 544637 | 12/1999 |
| WO | WO 98/11528 | 3/1998 |
| WO | 98/14863 A2 | 4/1998 |
| WO | 99/18495 A2 | 4/1999 |
| WO | 99/18495 A3 | 4/1999 |
| WO | 99/22338 A1 | 5/1999 |
| WO | 99/32960 A1 | 7/1999 |
| WO | 01/78055 A1 | 10/2001 |
| WO | 01/86920 A2 | 11/2001 |
| WO | 02/35459 A1 | 5/2002 |
| WO | 2004/066615 A1 | 8/2004 |

OTHER PUBLICATIONS

International Search Report mailed on Jun. 24, 2008 for PCT Patent Application No. PCT/US2008/000987, 1 page.
Finnish Search Report mailed on Apr. 23, 2002 for Finnish Patent Application No. 20011039, 1 page.
European Search Report mailed on Jul. 12, 2005, for EP Patent Application No. 05101591.5, 3 pages.
Finnish Search Report mailed on Aug. 25, 2004 for Finnish Patent Application No. 20045078, 2 pages.
Non-Final Office Action mailed on Jan. 23, 2012 for U.S. Appl. No. 12/449,182, filed Jan. 7, 2010, 14 pages.
Final Office Action mailed on May 8, 2012, for U.S. Appl. No. 12/449,182, filed Jan. 7, 2010, 15 pages.
Non-Final Office Action mailed on Feb. 8, 2012, for U.S. Appl. No. 12/569,797, filed Sep. 29, 2009, 11 pages.
Final Office Action mailed on Jul. 17, 2012, for U.S. Appl. No. 12/569,797, filed Sep. 29, 2009, 12 pages.
Non-Final Office Action mailed on Aug. 22, 2007, for U.S. Appl. No. 11/072,679, 6 pages.
Final Office Action mailed on Apr. 3, 2008, for U.S. Appl. No. 11/072,679, 6 pages.
Non-Final Office Action mailed on Aug. 20, 2008, for U.S. Appl. No. 11/072,679, 6 pages.
Notice of Allowance mailed on Mar. 20, 2009, for U.S. Appl. No. 11/072,679, 6 pages.

(56) References Cited

OTHER PUBLICATIONS

Non-Final Office Action mailed on May 11, 2012, for U.S. Appl. No. 12/454,562, 5 pages.
Non-Final Office Action mailed on May 21, 2012 for U.S. Appl. No. 12/455,679, 6 pages.
European Office Action mailed on Oct. 9, 2007, for EP Patent Application No. 05101591.5, 4 pages.
European Office Action mailed on Jan. 3, 2011, for EP Patent Application No. 05101591.5, 6 pages.
Non-Final Office Action mailed on Mar. 24, 2005 for U.S. Appl. No. 10/071,172, filed Feb. 8, 2002, 10 pages.
Non-Final Office Action mailed on Oct. 3, 2008 for U.S. Appl. No. 11/159,786, filed Jun. 23, 2005, 9 pages.
Notice of Allowance mailed on Jun. 15, 2009 for U.S. Appl. No. 11/159,786, filed Jun. 23, 2005, 6 pages.
Non-Final Office Action mailed on Jun. 20, 2012 for U.S. Appl. No. 12/710,944, filed Feb. 23, 2010, 6 pages.
Non-Final Office Action mailed on Dec. 6, 2012 for U.S. Appl. No. 12/454,562, filed May 19, 2009, 5 pages.
Non-Final Office Action mailed on Dec. 11, 2012 for U.S. Appl. No. 12/455,679, filed Jun. 4, 2009, 5 pages.
Final Office Action mailed on Mar. 18, 2013 for U.S. Appl. No. 12/710,944, 14 pages.
Office Action, dated Aug. 7, 2007, received in U.S. Appl. No. 10/530,004, 15 pages.
Final Office Action, dated Feb. 11, 2008, received in U.S. Appl. No. 10/530,004, 13 pages.
Office Action, dated May 28, 2008, received in U.S. Appl. No. 10/530,004, 9 pages.
Final Office Action, dated Dec. 2, 2008, received in U.S. Appl. No. 10/530,004, 10 pages.
Office Action, dated Aug. 18, 2009, received in U.S. Appl. No. 10/530,004, 11 pages.
Final Office Action, dated Mar. 31, 2010, received in U.S. Appl. No. 10/530,004, 12 pages.
Office Action, dated Oct. 6, 2005, received in U.S. Appl. No. 10/110,400, 10 pages.
Office Action, dated Jul. 25, 2003, received in Chinese Patent Application No. 00814214.9, which corresponds with U.S. Appl. No. 10/110,400, 2 pages.
Office Action, dated Apr. 22, 2016, received in U.S. Appl. No. 14/670,276, 16 pages.
International Search Report, dated May 6, 2002, received in International Patent Application No. PCT/FI2002/000095, which corresponds with U.S. Appl. No. 10/071,172, 3 pages.
Rekimoto, Jun; "Tilting Operations for Small Screen Interfaces (Tech Note)"; UIST '96 Proceedings of the ACM Symposium on User Interface Software and Technology Seattle, Washington USA; Nov. 6-8, 1996, pp. 167-168.

* cited by examiner

METHOD, DEVICE AND PROGRAM FOR BROWSING INFORMATION ON A DISPLAY

RELATED APPLICATION

This application is a continuation of U.S. application Ser. No. 12/569,797, filed Sep. 29, 2009. U.S. application Ser. No. 12/569,797 is a continuation of U.S. application Ser. No. 11/159,786, filed Jun. 23, 2005, now U.S. Pat. No. 7,607,111, which is a continuation-in-part of U.S. application Ser. No. 10/071,172, which is a continuation-in-part of U.S. application Ser. No. 10/071,172, filed Feb. 8, 2002, which claims the benefit of and priority to Finnish Patent Application Serial No. 2001/1039, filed May 16, 2001, the contents of all of which are incorporated by reference herein in their entirety.

BACKGROUND

The present invention relates to display devices where information can be browsed. In particular, the present invention relates to a novel and improved method and system for browsing information with hand-held devices with a display device.

Various electronic mobile devices, e.g. mobile phones, computers, Personal Digital Assistants (PDA, comprise displays. The transfer of the information to be viewed on the display is executed at least partially by a processor. A device typically comprises also a keypad with which the user of the device enters various commands. There are also touch-sensitive displays (touch screens). There a separate keypad is not needed. A device is controlled by touching the touch screen.

The display of a mobile device is capable of showing only limited amount of information at a time. Because of the size of the display, e.g. a large image must be viewed part by part. In order to view such an image, the user of the device controls the display, e.g. by scrolling the display with a mouse etc.

Devices equipped with a display have different kinds of user interfaces with which the user interacts with the device. There are graphical user interfaces and speech controlled user interfaces. A graphical user interface can be controlled with various control devices including, for example, keypad, touch screen, different kinds of cursor controlling methods, etc.

There are, however, drawbacks in the prior-art devices in the usability of the device, especially in the browsing of information with the device. When the information to be viewed on the display must be viewed by parts, it is difficult and slow to browse the whole information part by part. It is, for example, difficult to display a wide panorama picture on the display, while at the same time quickly and easily browsing the picture.

For the user of a mobile hand-held device it is difficult to perceive visual entireties that can not be displayed at a time on the display. Therefore the browsing of the information should be carried out as naturally and logically as possible. A user of a mobile hand-held device must be able to learn and use the device easily and efficiently.

From prior-art solutions it is known to use location detectors for browsing information with a device. Reference publication WO 9918495 (Telefonaktiebolaget L M Ericsson) describes a method where the display device is moved essentially in the plane of the display device, whereby different parts of a complete screen image are shown on said display device. When the display device is moved essentially in a direction perpendicular to the plane of the display device, the magnification of the screen image changes. The movement in the plane is a bit problematic. In the plane movement the necessary movements may be quite remarkable/large, and it may be difficult to maintain the display device in a proper position for reading or browsing.

Another prior-art solution is to use tilt detectors for moving, or to be more specific, for scrolling the view on the display device. One solution of this kind is described in WO 9814863 (Philips). When the screen image is moved by scrolling (tilting the display device), the result is better than in moving the display device in the plane of the display device, as described above. However, to move the screen image fluently and to return from some point to the initial point of browsing is difficult because controlling a discontinuous motion requires continuous and precise handling of the display device. The controlling of the scrolling movement can be compared to a movement of a ball on a plane surface by tilting the plane. In order to stop the rolling of the ball, the plane surface must be perpendicular against the gravity of the earth. In other words, the control of the movements and usability are not at an acceptable level so that the use of such a device would be natural and logical.

There are also various kinds of motion and/or location controlled display devices used in, e.g. in virtual helmets. There the display device focuses like a virtual camera. The display device displays an object to which the device (camera) points in the modeled virtual environment. To use a virtual camera model in a hand-held device is not so straightforward because displaying peripheries of a large screen image results in a disadvantageous viewing angle. Therefore, the adjustment and zooming of a display image must be implemented in a most natural and logical manner. In prior-art solutions the browsing of information on the display device is slow and awkward because the solutions are based on artificial logic.

SUMMARY

An objective of the present invention is to adjust the view on a display device in a manner as natural as possible so that the user of the hand-held device can concentrate on the information displayed on the display device and not on the adjustment of the displayed information.

The objective is achieved by a method, hand-held device and computer program for browsing information on a display device of a hand-held device. In the present invention, the display device is coupled to a processor mapping the information content generated by the processor into the virtual data object suitable for conveying the information to the user of the hand-held device. The display device displays a portion of the virtual data object at a time on the display device. The virtual data object comprises e.g. characters, pictures, lines, links, video or pixels that can be conveniently displayed on the display device at a time.

The idea of the present invention is to browse information on the display device of a hand-held device naturally and logically. Characteristic of the invention is that information is browsed on the display device essentially in a mirror-like way. In other words, the portion of the virtual data object displayed on the display device is moved at the same direction as the hand-held device is tilted. In other words, the movements of the portion of the virtual data object displayed on the display device depend on the orientation of the hand-held device. An important feature of the invention is also that a certain orientation of the hand-held device always displays the same portion of the virtual data object on the display device. The browsing method described above is extremely logical, and the movements and responses to the movements are natural.

The core functions of the browsing can be explained by means of the following example. The information is browsed with the hand-held device essentially in the same way as looking at a view from a hand mirror. The hand mirror is typically held in hand quite close to the viewer. The hand mirror represents the display device and the view behind the viewer the virtual data object. When the hand mirror is tilted, the view behind the viewer moves in response to the changes in the orientation of the hand mirror.

When approaching the functionality of a hand mirror the browsing of information on a display device of a hand-held device is made natural and logical.

The present invention is most applicable with hand-held devices with a display when a large data object is displayed by parts on the display. With the present invention, a large data object can be browsed naturally and logically from the user's perspective. The position memory of the muscles of a human body makes it easier to return to previously browsed points and to the starting point.

The present invention also reduces the need to use exterior mechanical switches, keypad or other known control mechanisms for browsing information on the display device. Therefore the use of a hand-held device is easier and simpler. The basic functionalities of the present invention can be implemented with mass production components, and with moderate processing power. Thus, the features described in the present invention can be taken in use in consumer products without notable expense increase.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DRAWINGS

Figure 2A:
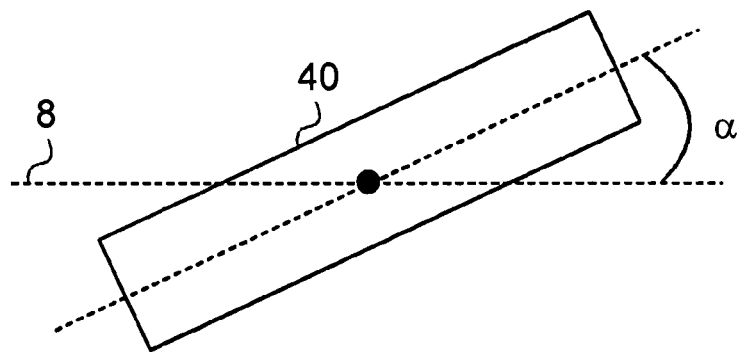
Figure 2B:
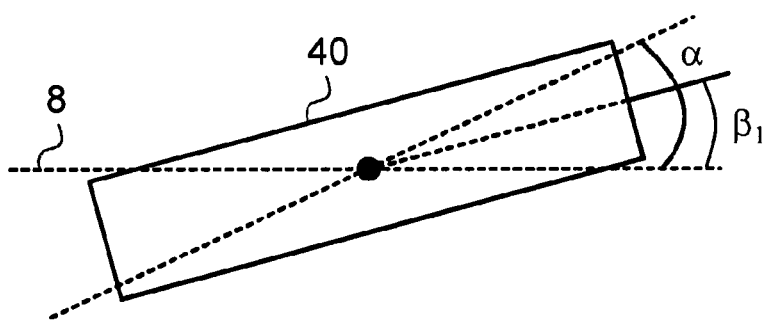
Figure 2C:
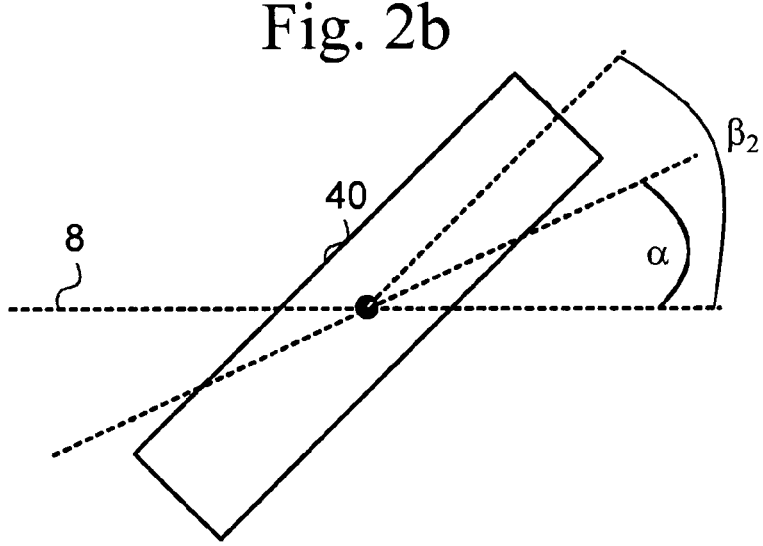
Figure 3:
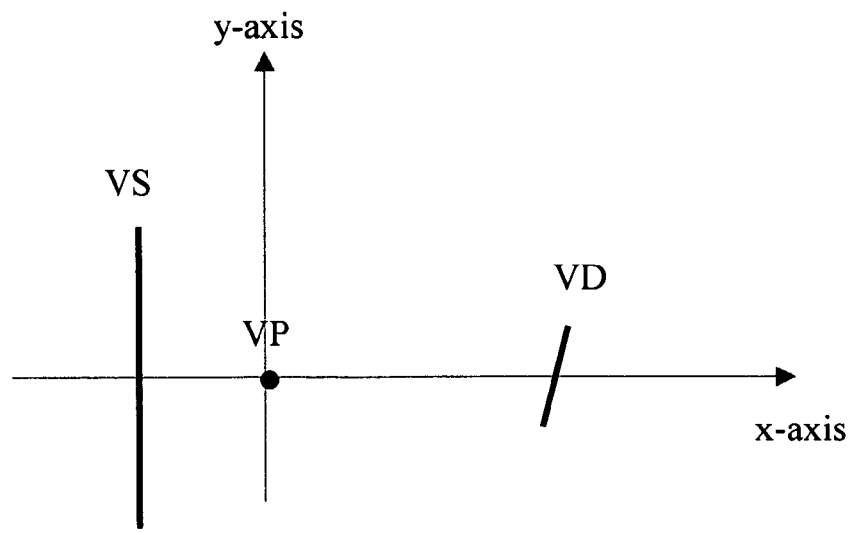
Figure 4:
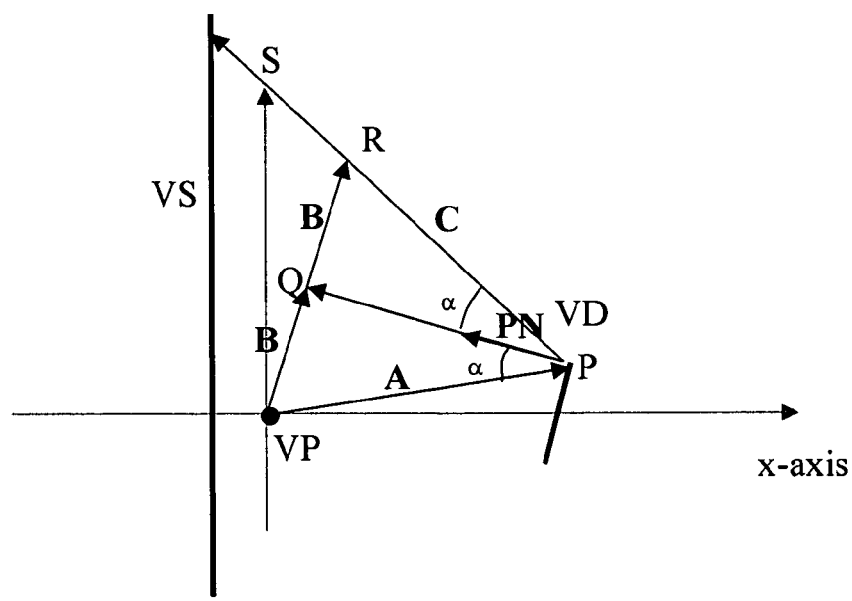
Figure 5:
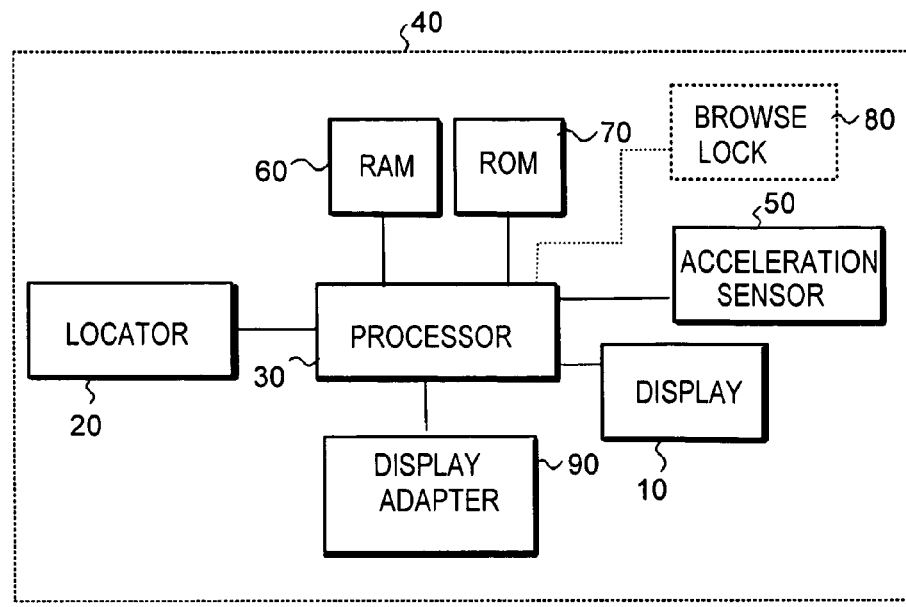
Figure 6:
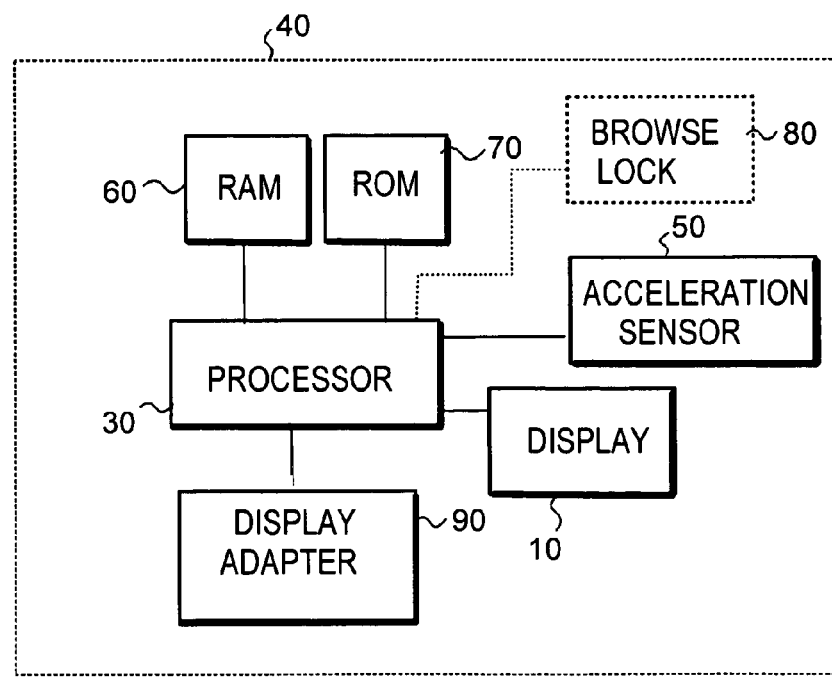
Figure 7A:
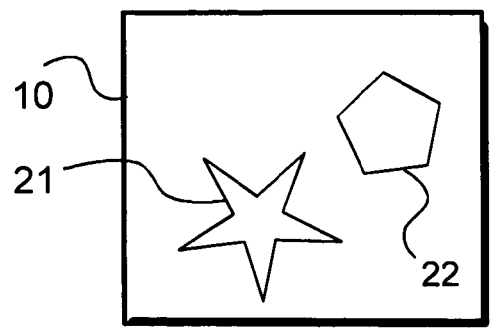
Figure 7B:
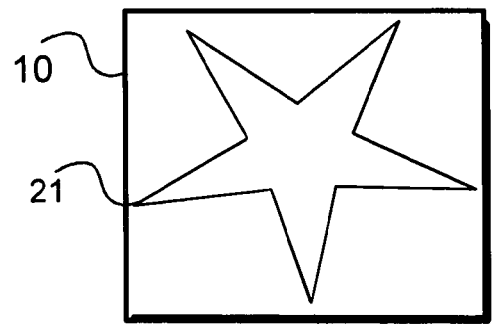
Figure 7C:
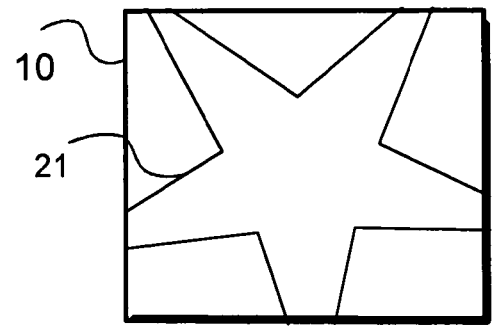
Figure 7D:
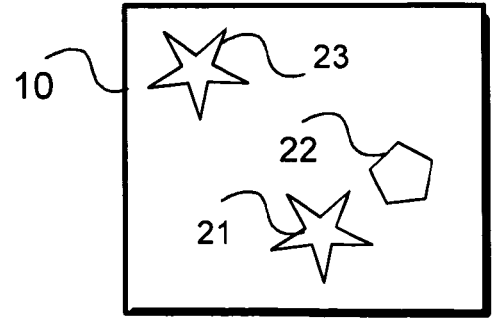
Figure 8A:
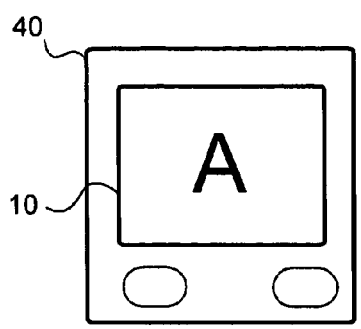
Figure 8B:
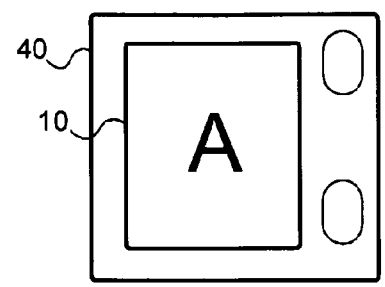
Figure 8C:
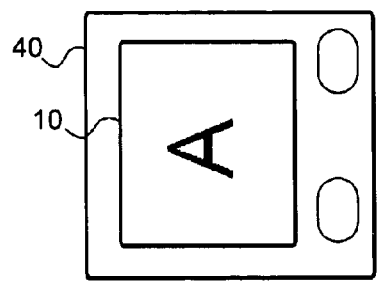
Figure 9:
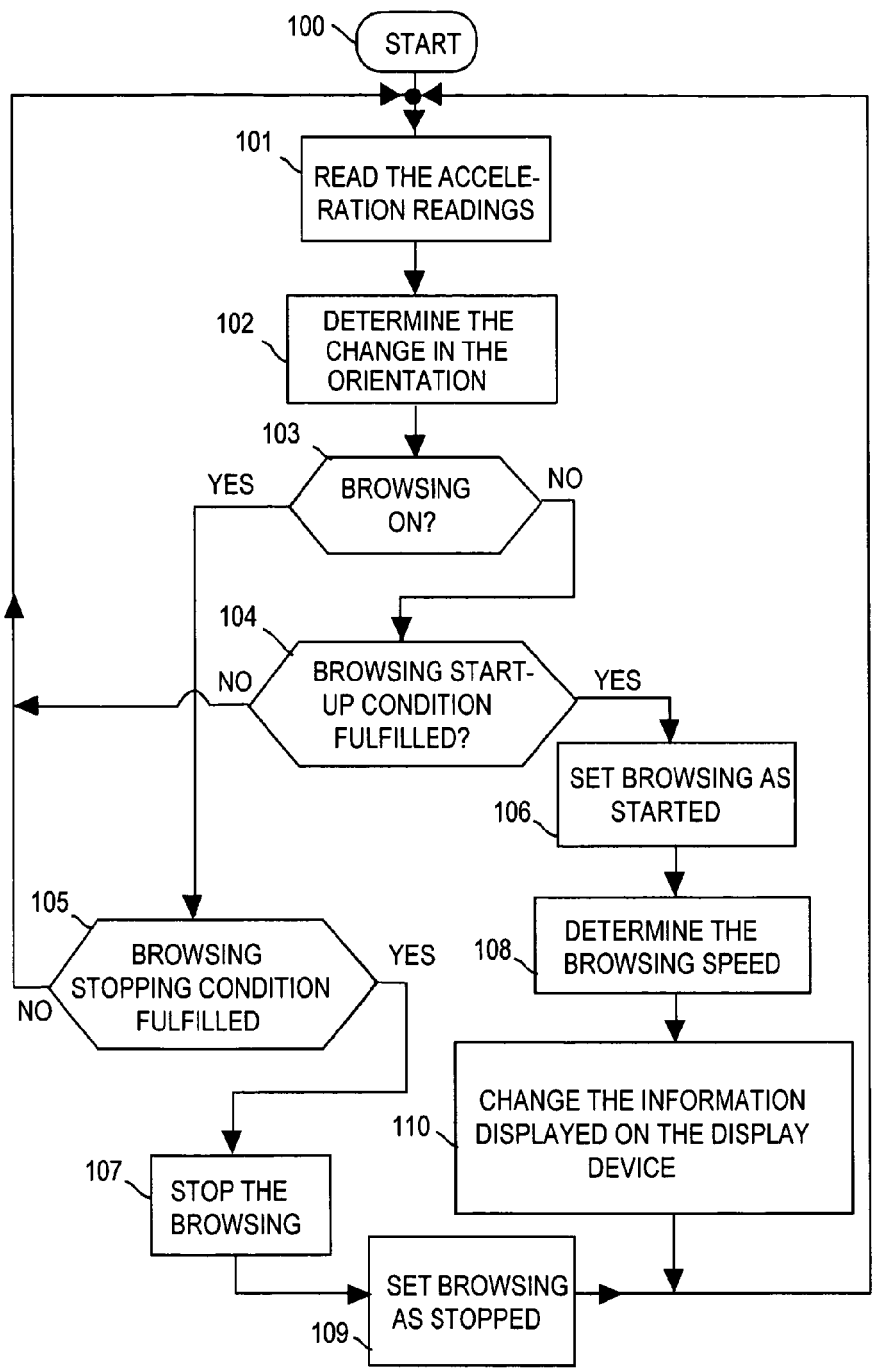

The above-mentioned features and objects of the present disclosure will become more apparent with reference to the following description taken in conjunction with the accompanying drawings wherein like reference numerals denote like elements and in which:

FIG. 1 illustrates how the hand-held device is operated according to the present invention, FIGS. 2a, 2b and 2c illustrate more specific examples of how the hand-held device of FIG. 1 is handled, FIG. 3 illustrates an exemplary viewing setup of the present invention, FIG. 4 illustrates an example of how a view on the display device can be formed and calculated according to the viewing setup of FIG. 3, FIG. 5 is a block diagram illustrating an embodiment of the hand-held device in accordance with the present invention, FIG. 6 is a block diagram illustrating another embodiment of the hand-held device in accordance with the present invention, FIGS. 7a, 7b, 7c and 7d illustrate the view change of the display of the hand-held device in response to user actions, FIGS. 8a, 8b and 8c illustrate different ways of browsing information, FIG. 9 is a flow diagram illustrating the operation of a preferred embodiment of the present invention, and FIGS. 10a-10d illustrate another example of how a view on the display device can be formed and calculated according to the viewing set up of FIG. 4.

DETAILED DESCRIPTION

FIG. 1 illustrates a simplified portable hand-held device according to the present invention. The hand-held device is e.g. a mobile phone or a Personal Digital Assistant (PDA). The display device of the hand-held device displays information stored on a memory of the hand-held device. The hand-held device is explained more specifically in later examples. FIG. 1 represents the basic browsing functionality. Information is browsed on the display device by tilting (rotating) the hand-held device 40 towards directions 2, 3, 4, and 5 around the axis 6 and 7. The memory of the hand-held device 40 comprises a virtual data object comprising characters, pictures, lines, links, video or pixels that can be conveniently displayed on the display device at a time. A portion of the virtual data object displayed on the display device is moved at the same direction as the hand-held device is tilted. Moreover, a certain orientation of the hand-held device 40 always displays the same portion of the virtual data object on the display device.

FIGS. 2a, 2b and 2c represent a more specific example of tilting the hand-held device 40. It can be said that a typical starting situation is that the hand-held device 40 is in a 20-30 degree angle with the horizontal plane 8. This plane is in one embodiment set as a default xy-plane from which the rotation angles of the hand-held device 40 are measured. It can also be said that this starting point is the most appropriate one for viewing information with the display device. So when the user tilts the hand-held device 40, the viewing angle changes. The view on the display device changes in real time to correspond to the new viewing angle. A very important feature of the invention is that the view on the display device depends on the viewing angle, and the same viewing angle displays always the same view on the display device. This feature is very natural and logical.

In FIG. 2a, angle a corresponds to the aforementioned 20-30 degrees. FIG. 2a is regarded as a starting position when the browsing begins. In FIG. 2b, the hand-held device 40 has been tilted to an angle $\beta_1$, which is smaller than angle α. The view on the display device changes based on the tilting movements essentially in real time, and the movement of the information on the display device is towards the same direction as the hand-held device 40 is tilted. In FIG. 2c, the hand-held device 40 is tilted to an angle $\beta_2$, which is bigger than angle α.

In one embodiment, the angle (α) is a predetermined angle, and it is determined by the manufacturer of the hand-held device 40. In the determination process it is defined that the display view plane is based on axis x_VD and y_VD, which are perpendicular to each other. The hand-held device is then set to a certain position (α), and that position is set as a default xy-plane. In FIGS. 2a, 2b and 2c, the default plane is determined based on angle a. In another embodiment, the default plane can be freely determined based on any x-axis, y-axis and/or z-axis.

From that moment on, the hand-held device 40 is tilted in respective to this plane. When the default xy-plane is fixed, the user of the hand-held device is always capable of returning to a certain view by tilting the device back to the original orientation when the sensors measuring the orientation of the hand-held device do not cause any restrictions to the measured position. In another embodiment, the angle α can be readjusted to a desired value.

FIGS. 3 and 4 represent an exemplary embodiment of the setup of a "mirroring system". It includes a viewpoint VP, a virtual screen VS and a virtual display VD. The viewpoint VP represents the location of a viewer of a hand-held device. The VD represents the display device of the hand-held device. The virtual screen represents the actual information browsed on the display device.

For simplicity in the following the viewpoint VP is defined to be at point [0 0 0]. Furthermore, the middle point of the virtual display VD is defined to be at P_xyz wherein $P\_xyz=[P\_xyz_1 \; P\_xyz_2 \; P\_xyz_3]^T$, and the virtual screen VS to be at plane x=kuva_shift.

The orientation of the virtual display VD is defined by tilting angels $\alpha_x$, $\alpha_y$, $\alpha_z$ indicating rotation angle over each coordinate axe. In FIG. 4, the virtual display VD is a plane and has some size. Each coordinate in this VD plane is defined using notation $P=[P\_xyz_2+peili\_y \; P\_xyz_3+peili\_z]$ when the orientation of the VD is defined to be parallel with the x-plane.

It must be noted that FIGS. 3 and 4 represent only one embodiment of the possible positions of the VS, VP and VD, and the axes used.

In order to the determine the orientation of the VD, two orthogonal vectors (in the x-plane) are defined as follows:

$$L=[0,1,-1]^T$$

$$M=[0,1,1]^T$$

Those vectors present the orthogonal direction vectors of the VD. Next, the orientation of the virtual display VD is defined using the rotation angles:

$$R_x = \begin{bmatrix} 1 & 0 & 0 \\ 0 & \cos(\alpha_x) & -\sin(\alpha_x) \\ 0 & \sin(\alpha_x) & \cos(\alpha_x) \end{bmatrix}$$

$$R_y = \begin{bmatrix} \cos(\alpha_y) & 0 & \sin(\alpha_y) \\ 0 & 1 & 0 \\ -\sin(\alpha_y) & 0 & \cos(\alpha_y) \end{bmatrix}$$

$$R_z = \begin{bmatrix} \cos(\alpha_z) & -\sin(\alpha_z) & 0 \\ \sin(\alpha_z) & \cos(\alpha_z) & 0 \\ 0 & 0 & 1 \end{bmatrix}$$

Next the unit normal vector of the VD is calculated:

$$PT_1 = R_x R_y R_z L$$

$$PT_2 = R_x R_y R_z M$$

$$PNT = PT_1 \times PT_2 \text{(cross product)}$$

$$PN = \frac{PNT}{|PNT|}$$

where PN is the unit normal vector of the VD-plane. The PN defines the applicable orientation of the VD to be used in the projection calculation.

Next, the "image" on the virtual display VD is calculated. Let's assume that there is a vector beginning from the VP and being reflected via the VD. The point where the reflected vector hits on the plane VS defines the projection of the point on the VS to the point on the VD-plane. Hence, if all points on VD are processed as described above, the image on the VD can be defined.

The idea of calculation is presented using vectors in FIG. 4. Using the vectors the algorithm works as follows:

1. The points P and VP define a vector A.
2. The projection proj of the vector A on the normal vector PN is calculated.
3. The sum of the vector A and proj*PN defines a point Q.
4. The points Q and VP define a vector B.
5. The point defined as sum of the VP and 2*B defines a point R.
6. The direction vector that goes via P and R defines a direction vector that hits the plane VS at point S.
7. The result of this process is that the image of point P in VD is the image of point S in VS.

By repeating phases 1-7 for all points in the VD-plane the whole image of the virtual display VD is defined. Using vector calculation the same can be presented as follows:

First the point P is defined:

$$P=P\_xyz+R_x R_y R_z [0 \; peili\_y \; peili\_z]^T$$

where P_xyz is the coordinate of the middle point of the VD, peili_y is the y-coordinate on the VD plane-coordinate system and peili_z is the z-coordinate on the VD plane-coordinate system Next, the projection on the normal vector is defined:

$$A = P - VP$$

$$proj = \frac{A \cdot PN}{|PN|}$$

Hence the point Q can be defined:

$$Q=P-proj*PN$$

Further, the point R can be defined (the reason for the factor 2 is that in mirror the arriving and departing light beam have equal angles compared to the normal vector of the surface).

$$B=Q-VP$$

$$R=VP+2*B$$

And finally the direction vector C is defined as follows:

$$C=R-P.$$

Because the VS is located at plane x=kuva_shift, the vector C hits that plane at the point $$S = k*C + P$$

where $$k = \frac{-P_1 + \text{kuva\_shift}}{C_1}$$

where $P_1$ is the x-component of the point P and $C_1$ is the x-component of the vector C. Note that in this calculation the VP was defined to the origin to simplify the presentation of the algorithm. However, in practice the VP can locate freely in the coordinate space. It must be noted that the image on the virtual screen VS is horizontally inversed when the virtual screen VS is viewed from the viewpoint VP direction.

The system of FIG. 4 has several characteristics:
1. The view on the display device moves into the same direction as it is tilted. In one embodiment, the movement of the portion of the virtual data object displayed on the display device is proportional to the change amount and/or rate of the rotational movement.
2. When the distance between the VP and VD increases, the same tilting angle causes greater movements on the virtual screen VS. In other words, the browsing speed of the information on the display device increases as the distance between the VP and VD increases. In one embodiment, this movement factor can be adjusted by the user of the hand-held device.
3. When rotating the display device, the view on the display device remains unchanged in relative to the user.
4. The view on the display device depends on the position and orientation of the VS, VP and VD.
5. A certain VS-VP-VD position/orientation combination always constitute the same view on the display device.
6. When the position of the VD alters, the viewing angle between the VP and VD changes.
7. Zooming can be implemented by changing the position of the VS, VP and VD.
8. Zooming can be implemented by enlarging the object on the VS or altering the radius of curvature of the mirror (VD).
9. If the figure on the VS is in the right way when viewed from the VP, the view on the VD is mirrored (horizontally inversed).

The present invention does not have to implement all the aforementioned features, but the most appropriate ones can be chosen. The ideal mirror-like functionality means that the information on the display device changes when:
  a) the location or orientation of the hand-held device in proportion to the coordinates bound to the physical environment changes,
  b) the location of the user (VP) in proportion to the coordinates bound to the hand-held device changes,
  c) the virtual location of the data (virtual screen) displayed on the display device in proportion to the coordinates bound to the physical environment changes.

In order to simulate the operation of a mirror to the user, the information on the display device is changed at least either according to a) or b). If only a) or b) is taken into consideration, the operation of the display is not so mirror-like as if both a) and b) were implemented. In one embodiment, the display device operates according to all a), b) and c).

Figure 10A:
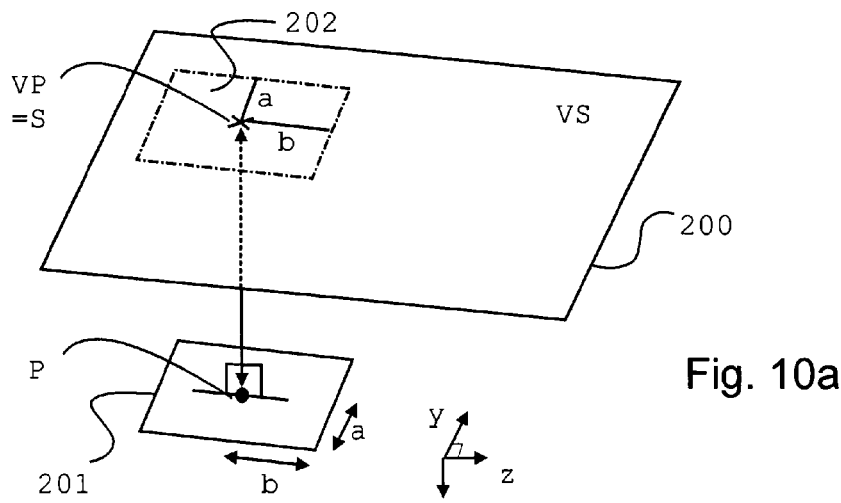
Figure 10B:
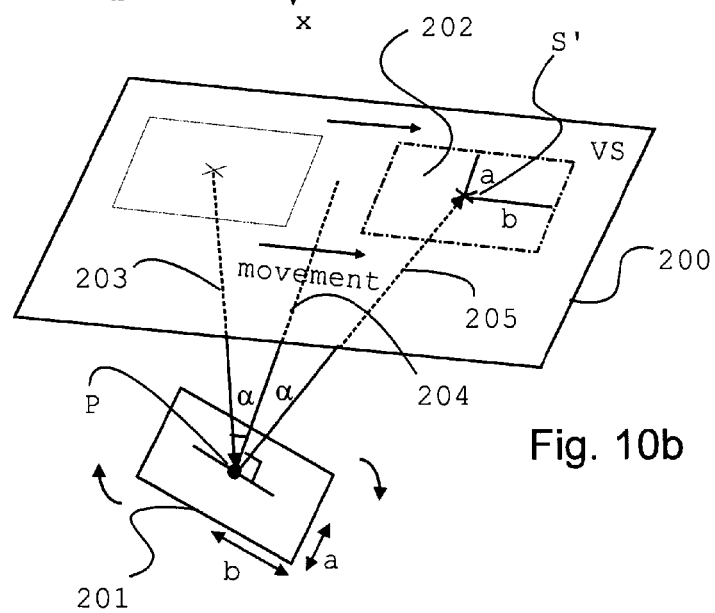
Figure 10C:
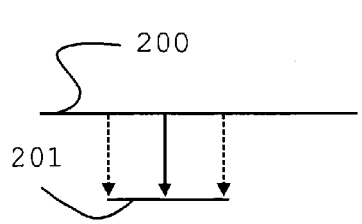
Figure 10D:
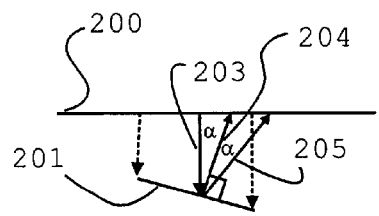

FIGS. 10a-d illustrate another example of calculation which is explained with reference to FIG. 4. FIG. 10c is a side view of FIG. 10a and FIG. 10d is a side view of FIG. 10b. In this example the virtual screen is referred to as the virtual surface 200.

In FIGS. 10a and 10c the default orientation of the display 201 is determined to be parallel with the yz-plane. The virtual surface (VS) 200 is above the display plane and also parallel with the yz-plane. A page having information to be browsed lies on the virtual surface 200, and the size of the page is larger than the size of the display 201. The reference point VP is on the virtual surface 200. The x-axis (not shown) runs through the reference point VP and the middle point P of the display 201. After calculating the point S by the method presented with reference to FIG. 4, the result is that point S is equal to point VP. Of course, the relationship between every single point in the area (2a*2b) of the display 201 and the corresponding area (2a*2b) on the virtual surface 200 can be calculated in a similar way. The portion of the page (2a*2b) that is to be displayed then has a shape similar to the shape of the display (2a*2b). In other words, on the point S on the virtual surface 200 is the middle point of the determined rectangle 2a*2b and all the other points residing around point S within the rectangle relate to the corresponding the points residing around point P on the display 201. That portion of the page surrounding point S on the virtual surface is displayed on display 201.

In FIGS. 10b and 10d the display 201 has been tilted around the y-axis, wherein the portion of the page shown on the display 201 changes in the following way:

Initially (i.e. when the virtual surface 200 and the display surface 201 are parallel with respect to each other as shown in FIGS. 10a and 10c) a reference line 203 drawn between point P and point S meets the x-axis, i.e. it is parallel with the x-axis. The normal of the display extending from point P is parallel with the x-axis and the reference line 203. When display 201 is tilted by angle a with respect to the virtual surface 200, the normal 204 of the display is also tilted by angle a with respect to the x-axis. After the display 201 is tilted as shown in FIGS. 10b and 10d, the reference line 203 is mirrored with respect to the normal 204 of the display wherein a mirror line 205 is generated. A hit point S' is the point where the mirror line 205 hits the virtual surface 200. In the same manner as above, an area (shape) of the page corresponding to the area (shape) of the display is determined. The display 201 then shows the portion of the page around the hit point S' and having a shape similar to the shape of the display 201.

FIG. 5 represents one example of a preferred hand-held device 40. The hand-held device 40 is e.g. a mobile phone. The hand-held device comprises a processor 30 and a display device 10 coupled to the processor 30. The data memory 60 and the program memory 70 are also coupled to the processor 30. The program memory 70 contains e.g. the operation system. The sizes of the memories, and the processing power of the processor 30 depend on the device and application used. The program memory 60 can additionally contain different kinds of software applications with which various tasks can be executed. Application software comprise e.g. word processing, graphical and spreadsheet software. The software applications and data used by them are loaded into the data memory 60 in order to be able to use the software.

The display adapter 90 with the processor 30 controls the display device 10. In order to not to use the data memory 60 for storing display-related information, the display adapter 90 comprises a data buffer in which the information to be displayed on the display device 10 is stored.

The hand-held device 40 comprises measuring means which in a preferred embodiment of the invention refer to acceleration sensor(s) 50. With the acceleration sensor(s) 50 it is possible to measure tilting movements of the hand-held device 40. The processor 30 receives the measurement results and interprets them. The acceleration sensor(s) 50 can be e.g. piezo-electric or capacitive producing an analog voltage which is proportional to the acceleration factor.

With the acceleration sensor(s) 50 it is possible to measure one, two or three-dimensional accelerations. The measurement of tilting movements is based on the fact that the highest acceleration is parallel to the gravity of the earth. Therefore, the orientation of the hand-held device 40 can be defined in relation to the earth. It is also possible to use gyroscopes with its various forms to measure the orientation of the hand-held device 40. The quantities measured are e.g. tilting angle and accelerations.

The relation information between the rotation degree of the hand-held device and the memory address corresponding to the displayed view is stored e.g. on the data memory 60. The processor 30 defines the orientation of the hand-held device 40 in relation to the user or a reference position. The processor 30 may also define the distance between the user and the hand-held device 40 or the user orientation in relation to the hand-held device 40.

The most important point is not the way of how the aforementioned definitions are made but the fact that the orientation of the hand-held device 40 affects the information displayed on the display device 10. The memory space can be implemented logically, e.g. as a two-dimensional memory space. When browsing starts, the processor 30 starts the definition process of the new memory address from the current memory address so that displacement in the memory space corresponds to the direction and amount of change in orientation according to the relation information.

The hand-held device 40 comprises also a browse lock 80 with which it is signaled when the browsing is executed. The orientation of the hand-held device 40 must remain in the same position in order to keep the view on the display device unchanged. In a preferred embodiment, the hand-held device 40 comprises a lock feature, e.g. a push-button, with which the browsing can be locked. The user can tilt the hand-held device back to an appropriate viewing orientation in order to view the information on the display device 10 properly. The browsing may then continue when the button is released.

The hand-held device 40 in FIG. 6 is almost the same as the hand-held device 40 in FIG. 5. In FIG. 5, the hand-held device comprises also a locator 20. It is possible to control the view on the display device 10 also by other means than acceleration sensor(s) or equivalent means. The hand-held device 40 can comprise e.g. a (video) camera measuring the orientation and location of the hand-held device in relation to the user of the hand-held device 40 or to another reference point in the surroundings of the user. The camera 20 may be set to recognize and measure distance to a certain reference point, e.g. the eyes of the user. Therefore, when the orientation and/or position of the hand-held device 40 changes, the viewing angle measured by the camera also changes. Thus, it can be concluded that the hand-held device 40 has been tilted and/or moved towards some direction.

By analyzing the video image it is possible to define the orientation of the hand-held device 40 in proportion to the reference point and the distance of the hand-held device 40 to the reference point tens of times within a second. The browsing functionality can be implemented merely using the video camera, so that additional acceleration sensor(s) are not necessarily needed. The measuring of the distance can also be implemented with an ultrasonic radar connected through an analog-digital converter to the processor 30 of the hand-held device 40. In one embodiment, from the user's perspective the information on the display device 10 is essentially browsed in the same manner as when looking in a mirror. In other words, the view on the display 10 depends on the viewing angle in relation to the display device plane as the view in a mirror depends on the viewing angle to the mirror.

In one embodiment of FIG. 5, the locator 20 comprises a video camera seeking the location of the head and eyes of the user. Heuristic algorithms and neural network seeking the location of the head and eyes can be used. Acceleration sensors are more appropriate to use in hand-held devices than a video camera, because they are cheaper. The acceleration sensors may also be a more appropriate solution in devices which do not have a built-in video camera for a default feature, e.g. in the (third generation) mobile phones. The advantage of the use of the video camera is that the use of the hand-held device is not restricted to the position of the hand-held device, e.g. when being on one's back the hand-held device can be used without problems. Also the selection of starting point of browsing is more free, and choice (of the starting point) can be given to the user of the hand-held device. In one embodiment of FIG. 5, the display device surface level is set as an xy-plane. A certain relation between the x-axial and/or y-axial movement of the hand-held device and the amount of the displacement of the portion of the virtual data object displayed on the display device at a time has been determined. So, when the hand-held device 40 is moved along x- and/or y-axis, the portion of the virtual data object displayed on the display device moves in the same direction as the hand-held device is moved in the xy-plane according to the relation information.

In a preferred embodiment of FIGS. 5 and 6 the processor 30 comprises also means for filtering the x-axial, y-axial and/or tilting movements before displaying the movements on the display device. Therefore, minor unintentional movements can be filtered out.

In one embodiment of FIGS. 5 and 6, the relation between the tilting movements and the amount of the displacement of the portion of the virtual data object displayed on the display device at a time can be changed. Therefore, a user may define e.g. that from now on a 10 degree tilting causes the same effect on the display as a 15 degree tilting earlier. In one embodiment, the relation is linear. In other words, the relation between the tilting movements and the amount of the displacement of the portion of the virtual data object displayed on the display device at a time does not depend on the amount of the tilting. In another embodiment, the relation is linear, but e.g. exponential. In other words, the amount of the displacement of the portion of the virtual data object displayed on the display device at a time depends on the amount of the tilting. For example, the value of the relation factor changes (e.g. exponentially) as the tilting amount increases.

FIGS. 7*a*-7*d* represent the situation where the size of the information on the display device depends on the zoom factor in addition to the orientation of the hand-held device. The zoom factor can be controlled in different ways. In one embodiment, the zoom factor depends on the distance between the user and the hand-held device. FIG. 7*a* represent the display device 10, on which graphical FIGS. 21, 22 and 23 are seen. The view on the display device 10 depends on the orientation of the hand-held device or the viewing angle from which the user of the hand-held views the display device. When the user of the hand-held device sets FIG. 21 in the middle of the display device, and the zoom factor is increased, FIG. 21 grows as depicted in FIGS. 7*b* and 7*c*. In FIG. 7*d*, the zoom factor has decreased, and also the viewing angle between the user and the hand-held device has changed.

The zoom factor can be modified with several different ways. In one embodiment, the zoom factor depends on the distance between the reference point (e.g. the eyes of the user) and the hand-held device. When the distance decreases, FIG. 21 grows, and vice versa. The display device 10 may have to be set to a zoom mode before the zoom factor changes. If the zoom factor was all the time dependent on the distance between the reference point and the hand-held device, the browsing operation would not necessarily be practical because the view on the display 10 would change whenever the aforementioned distance changes.

In another embodiment, the zoom factor changes when rotating the hand-held device around the axis being essentially perpendicular to a predefined xy-plane. The xy-plane may be the present plane of the display device 10 or some other predetermined plane. Yet in another embodiment, the zoom factor is changed by tilting the hand-held device. Before this the display device must be set into a zoom mode. When the hand-held device is tilted, e.g. to the right the zoom factor increases, and when the hand-held device is tilted to the left, the zoom factor decreases. It is not important which predefined tilting directions are used but that the two directions can be separated sufficiently from each other. The aforementioned zoom mode is set on and off e.g. with a predetermined button of the hand-held device.

FIGS. 8a-8c represent different ways to implement the user interface. In FIG. 8a, the display device 10 of the hand-held device 40 contains information to be viewed by the user. In FIG. 8a, an A letter is on the display device 10, In one embodiment, the information on the display device 10 remains in the same position with respect to the user when the hand-held device 40 is rotated around the axis being perpendicular to the display surface plane, as depicted in FIG. 8b. In other words, the information on the display device 10 remains in the same position because the information is attached to the real physical coordinates.

In another embodiment, the information on the display device 10 remains in the same position with respect to the hand-held device 40 when the hand-held device 40 is rotated around the axis being perpendicular to the display surface plane, as depicted in FIG. 8c. In other words, the orientation of the information on the display device 10 changes with respect to the user of the hand-held device 40 because the information is not attached to the real physical coordinates but to the display device.

FIG. 9 represents a flow diagram describing the functionality of a method of the present invention. FIG. 9 describes a hand-held device 40 comprising means for measuring acceleration 50 and a processor 30. Means for measuring acceleration refer e.g. to a multiaxial acceleration sensor suited for measuring changes in the orientation of the hand-held device 40.

The hand-held device is switched on, and it is ready for browsing information on the display device, as represented in phase 100. When the hand-held device is functional, the acceleration sensor 50 measures constantly acceleration readings. The processor 30 receives the acceleration readings and defines the orientation of the hand-held device and also the change in the orientation compared to the prior measurement(s), as represented in phases 101 and 102. In phase 103, it is tested whether the browsing is on or off. If the browsing is off, the processor 30 examines if a predetermined browsing startup condition is fulfilled (phase 104). If it is not fulfilled, the method returns back to phase 101. It means that the orientation of the hand-held device has not changed sufficiently, which would indicate that the user wishes to browse information on the display device of the hand-held device.

If the predetermined browsing startup condition is fulfilled, the processor 30 sets the browsing as started (phase 106) and determines the browsing speed based on the current acceleration value (phase 108). The processor 30 also changes the information presented on the display device according to a relation between the rotation degree and the amount of the displacement of the portion on the virtual data object stored on the data memory 60 and the determined browsing speed (phase 108). A certain orientation of the hand-held device always causes the same view (the same portion on the virtual data object stored on the memory) on the display device. If it is observed in phase 103 that the browsing is already on, and the browsing stopping condition is fulfilled (phase 105), the processor 30 stops the browsing and sets the browsing as stopped (phases 107 and 109). If it is observed that the browsing stopping condition is not fulfilled (phase 105), the processor 30 returns back to phase 101.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. An electronic device comprising:
a processor; and
a display in communication with the processor, wherein the processor is configured to:
determine a tilt angle associated with the display, wherein the tilt angle associated with the display depends upon an orientation of the display; and
cause, based upon the tilt angle associated with display, a subset of content corresponding to the tilt angle to be displayed on the display, wherein a first subset of the content corresponding to a first tilt angle is displayed whenever the tilt angle associated with the display is determined to be the first tilt angle and a second subset of the content corresponding to a second tilt angle different from the first tilt angle is displayed whenever the tilt angle associated with the display is determined to be the second tilt angle, wherein the second subset of content is different from the first subset of content.

2. The electronic device of claim 1, wherein a different subset of content is displayed for each tilt angle.

3. The electronic device of claim 1, wherein the tilt angle is an angle measured between the orientation of the display and a reference plane, wherein the tilt angle is zero when the display of the electronic device is parallel to the reference plane.

4. The electronic device of claim 3, wherein the second tilt angle is zero and the display of the electronic device is parallel to the reference plane.

5. The electronic device of claim 1, wherein a third subset of content is displayed whenever the tilt angle associated with the display is determined to be a third tilt angle different from the first tilt angle and the second tilt angle.

6. The electronic device of claim 1, wherein the first subset of content or the second subset of content caused to be displayed on the display is locked/unlocked in response to the pressing/releasing of a push button.

7. The electronic device of claim 1, wherein every tilt angle has a corresponding portion of the content to be displayed.

8. The electronic device of claim 1, wherein a scrolling of content displayed on the display occurs only in a transition of the orientation of the display between the first tilt angle and the second tilt angle.

9. A method of browsing a page of contents, the method comprising:

determining, by a device, a first tilt angle associated with a display of the device, the first tilt angle measured between an orientation of the display and a reference plane;

determining, based upon the first tilt angle, a first portion of the page corresponding to the first tilt angle;

displaying, on the display, first content from the first portion of the page;

determining, due to a change in orientation of the display, that the angle between the orientation of the display and the reference plane has changed from the first tilt angle to a second tilt angle that is different from the first tilt angle;

determining, based upon the second tilt angle, a second portion of the page corresponding to the second tilt angle, wherein the second portion of the page is different from the first portion of the page; and displaying, on the display, second content from the second portion of the page instead of the first content when the angle between the orientation of the display and the reference plane is the second tilt angle.

10. The method of claim 9, wherein a different portion of content is displayed for each tilt angle.

11. The method of claim 9, wherein the display of the device is parallel to the reference plane in the second tilt angle.

12. The method of claim 9 further comprising:
determining, due to another change in orientation of the display, that the angle between the orientation of the display and the reference plane has changed from the second tilt angle to a third tilt angle that is different from the first and second tilt angles; and determining, based upon the third tilt angle, a third portion of the page corresponding to the third tilt angle, wherein the third portion of the page is different from the first and second portions of the page.

13. The method of claim 9, wherein a scrolling occurs only in a transition of the orientation of the display between the first tilt angle and the second tilt angle.

14. The method of claim 9, wherein every tilt angle corresponds to a particular portion of the page.

15. The method of claim 9, wherein the first portion of the page or the second portion of the page displayed is locked/unlocked in response to the pressing/releasing of a push button.

16. A method comprising:
determining a first tilt angle associated with a display of a handheld device, the first tilt angle measured between an orientation of the display and a reference plane;

determining a first portion of content corresponding to the first tilt angle;

displaying the first portion of content on the display;

determining, due to a change in orientation of the display, that the angle between the orientation of the display and the reference plane has changed from the first tilt angle to a second tilt angle that is different from the first tilt angle;

determining a second portion of content corresponding to the second tilt angle, wherein the second portion of content is different from the first content; and displaying the second portion of content on the display.

17. The method of claim 16, wherein a different portion of content is displayed for each tilt angle.

18. The method of claim 16, wherein the display of the handheld device is parallel to the reference plane in the second tilt angle.

19. The method of claim 16 further comprising:
determining a third tilt angle associated with the display of the handheld device, the third tilt angle measured between the changed orientation of the display and the reference plane and being different from the first tile angle and the second tilt angle; and determining a third portion of content corresponding to the third tilt angle, wherein the third portion of content is different from the first content and the second content.

20. The method of claim 16, wherein every tilt angle corresponds to a particular portion of content.

21. The method of claim 16, wherein the first portion of content or the second portion of content displayed is locked/unlocked in response to the pressing/releasing of a push button.

22. A non-transitory computer readable storage medium, storing one or more programs, which when executed by one or more processors of a handheld device having a display, cause the handheld device to perform operations comprising:

determining a first tilt angle associated with the display of the handheld device, the first tilt angle measured between an orientation of the display and a reference plane;

determining a first portion of content corresponding to the first tilt angle;

displaying the first portion of content on the display;

determining, due to a change in orientation of the display, that the angle between the orientation of the display and the reference plane has changed from the first tilt angle to a second tilt angle that is different from the first tilt angle;

determining a second portion of content corresponding to the second tilt angle, wherein the second portion of content is different from the first content; and displaying the second portion of content on the display.

23. The non-transitory computer readable storage medium of claim 22, wherein a different portion of content is displayed for each tilt angle.

24. The non-transitory computer readable storage medium of claim 22, wherein the display of the handheld device is parallel to the reference plane in the second tilt angle.

25. The non-transitory computer readable storage medium of claim 22, wherein the one or more programs, when executed by the one or more processors of the handheld device, cause the handheld device to further perform operations comprising:

determining a third tilt angle associated with the display of the handheld device, the third tilt angle measured between the changed orientation of the display and the reference plane and being different from the first tile angle and the second tilt angle; and determining a third portion of content corresponding to the third tilt angle, wherein the third portion of content is different from the first content and the second content.

26. The non-transitory computer readable storage medium of claim 22, wherein a scrolling of content displayed on the display occurs only in a transition of the orientation of the display between the first tilt angle and the second tilt angle.

27. The non-transitory computer readable storage medium of claim 22, wherein every tilt angle corresponds to a particular portion of content.

28. The non-transitory computer readable storage medium of claim 22, wherein the first portion of content or the second portion of content displayed is locked/unlocked in response to the pressing/releasing of a push button.

* * * * *